3,198,798
PHTHALIMIDO- AND ISOINDOLINYL-ALKYL-
PIPERAZINES AND THEIR PREPARATION
Bernard L. Zenitz, Colonie, and Lewis P. Albro, Greenbush, N.Y., assignors to Sterling Drug, Inc., New York, N.Y., a corporation of Delaware
No Drawing. Filed Nov. 2, 1962, Ser. No. 235,114
9 Claims. (Cl. 260—268)

This invention relates to novel piperazine derivatives and to processes for preparing the same.

In particular, the invention relates to 4-substituted-1-phthalimidoalkylpiperazines and 4-substituted-1-isoindolinyl-alkylpiperazines which have in their free base form the general formula

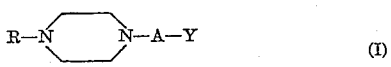
(I)

wherein R is a member of the group consisting of methyl and carbo-lower-alkoxy radicals, A is an alkylene radical, and Y is a member of the group consisting of phthalimido and isoindolinyl, either of which can bear one to four substituents. Said substituents are illustrated by, but not limited to halogen, lower-alkoxy, lower-alkyl, lower-alkyl-mercapto, and the like.

In general Formula I above, R is methyl or carbo-lower-alkoxy. Carbo-lower-alkoxy radicals have the formula —CO$_2$— lower alkyl in which the lower-alkyl moiety is a monovalent straight- or branched-chain saturated hydrocarbon radical of from one to six carbon atoms. Representative of carbo-lower-alkoxy radicals are carbomethoxy, carboethoxy, carbopropoxy, carboisopropoxy, carbobutoxy, carbo-isobutoxy, carbo-tert.-butoxy, carbopentoxy, carbohexoxy, and the like.

In Formula I above A is alkylene, that is, a straight- or branched-chain saturated divalent hydrocarbon radical having from two to ten carbon atoms in which the points of attachment to the remainder of the molecule are on different carbon atoms. In other words, the two nitrogen atoms joined by the radical A are separated by at least two carbon atoms. Representative of alkylene radicals are —CH$_2$—CH$_2$—, —CH(CH$_3$)—CH$_2$—
—CH(CH$_3$)—CH(CH$_3$)—CH$_2$—CH$_2$—CH$_2$—
—CH$_2$—CH(CH$_3$)—CH$_2$—, —CH$_2$—C(CH$_3$)$_2$—CH$_2$—
—CH(CH$_3$)—CH$_2$—CH$_2$—, —CH$_2$(CH$_2$)$_2$—CH$_2$—
—CH$_2$—CH(C$_2$H$_5$)—CH$_2$—CH$_2$—
—CH$_2$(CH$_2$)$_5$—CH$_2$—, —CH$_2$—(CH$_2$)$_8$—CH$_2$— and the like.

In Formula I above, Y is phthalimido or isoindolinyl, that is, a radical corresponding to the general formula

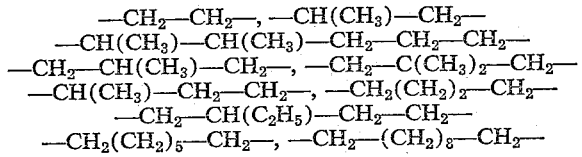
(II)

wherein X represents respectively an oxygen atom (O), or two hydrogen atoms (H$_2$), and Z represents from zero to four substituents comprising, for example, halogen, lower-alkoxy, lower-alkyl, lower-alkylmercapto, and the like.

In Formula I above, when R is carbo-lower-alkoxy, Y is phthalimido, and when R is methyl, Y represents isoindolinyl.

The compounds of Formula I wherein R is carbo-lower-alkoxy and Y is phthalimido are prepared by causing a phthalimidoalkyl halide to react with a 1-carbo-lower-alkoxy-piperazine. The process is preferably carried out in an inert solvent in a preferred temperature range between about 50° C. and about 150° C. It is convenient to employ an inert solvent which boils within the above preferred temperature range and to carry out the reaction at the reflux temperature of the solvent. Representative of suitable solvents for this purpose are benzene, toluene, chloroform, carbon tetrachloride, and lower-aliphatic alcohols.

Optionally, a proton acceptor can be added to the reaction mixture. By proton acceptor is meant a substance capable of reacting with the acid produced by the reaction of the phthalimidoalkyl halide and carbo-lower-alkoxypiperazine. In the absence of an additional proton acceptor, the basic nitrogen of the piperazine moiety reacts with the hydrogen halide produced in the reaction to give the hydrohalide salt form of the product.

The phthalimidoalkyl halides used as intermediates are prepared by conventional procedures. For example, they can be prepared by the reaction of the potassium salt of the desired phthalimide with an equivalent of alkylene dihalide, for example, alkylene dibromide, alkylene dichloride, or alkylene chlorobromide. The phthalimidoalkyl halides can also be prepared by the reaction of a monohaloalkanol with a potassium phthalimide followed by reaction of the resulting hydroxyalkylphthalimide with a halogenating agent, for example, thionyl chloride, hydrogen bromide, hydrogen iodide, phosphorous trichloride, and the like.

In the form of their free bases, the 1-carbo-lower-alkoxy - 4 - phthalimidoalkylpiperazines so produced are white crystalline solids which are slightly soluble in water. They are basic substances, having one basic nitrogen atom, and thus form acid-addition and quaternary-ammonium salts wtih strong acids and esters of strong acids respectively. The acid-addition salt forms are the full equivalents of their corresponding free bases in respect to their physiological activity.

The compounds of Formula I above wherein R is methyl and Y is isoindolinyl are prepared by causing compounds of Formula I wherein R is a carbo-lower-alkoxy group and Y is phthalimido to react with a suitable reducing agent, for example, lithium aluminum hydride. The process is carried out by mixing the 1-carbo-lower-alkoxy-4-phthalimidoalkylpiperazine with an excess of lithium aluminum hydride in a suitable inert solvent at a temperature between about 20° C. and about 100° C. Representative of suitable inert solvents for this reaction are di-lower-alkyl ethers, for example, diethyl ether, aryl-lower-alkyl ethers, for example, anisole, and tetrahydrofuran.

The 1-methyl-4-isoindolinyl-alkylpiperazines so produced are basic substances, having three basic nitrogen atoms, and form mono-, di- and tri-basic acid-addition salts and quaternary ammonium salts upon reaction with strong acids and esters of strong acids respectively. The acid-addition salts are the full equivalents of their corresponding free bases in respect to their physiological properties.

The acid-addition salt forms of the compounds of the invention are prepared by causing the corresponding free bases to react with the usual strong organic or inorganic acids employed for this purpose, usually in an inert solvent. Examples of such strong acids include hydrochloric, hydrobromic, sulfuric, phosphoric, citric, tartaric, quinic, benzene sulfonic, methanesulfonic acid, and the like.

As another aspect of the invention, the compounds of Formula I wherein X is oxygen and R is a carbo-loweralkoxy group can be used as intermediates for preparing quaternary ammonium salts having the formula

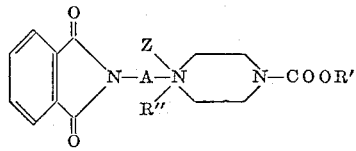

(III)

wherein R' is lower-alkyl, A is lower-alkylene, R'' is a member of the group consisting of lower-alkyl, lower-alkenyl and monocyclic-aryl-lower-alkyl, and Z is an anion.

In Formula III, the alkylene group A, and the lower-alkyl group R', are as defined above in formula I.

The group R'' can be lower-alkyl, and, as such, is as defined above for lower-alkyl.

The group R'' can be lower-alkenyl, and as such, is a straight-or branching-chain hydrocarbon radical containing from two to six carbon atoms and containing at least one double bond. The lower alkylene group is illustrated by, but not limited to viny, allyl, propenyl, 2-butenyl, 2,4-pentadienyl, and 3-hexenyl.

The group R'' can be monocyclic-aryl-lower-alkyl, and as such, is a monocarbocyclic- or monoheterocyclic-aryl radical bonded through a divalent, saturated, straight- or branched-chain aliphatic radical containing from one to six carbon atoms. Thus, the monocyclic-aryl-lower-alkyl group is illustrated by, but not limited to benzyl and benzyl substituted by from one to three inert substituents of low molecular weight, furyl, thenyl, picolinyl, and furyl, thenyl, and picolinyl substituted by from one to three inert substitutents of low molecular weight, penyl-ethyl, phenylpropyl, phenylbutyl, phenylamyl, and phenylhexyl, and phenylethyl, phenylpropyl, phenylbutyl, phenylamyl, and phenylhexyl substituted by from one to three substituents of low molecular weight. Exemplary of said substituents are halogen, nitro, lower-alkoxy, lower-alkyl, trifluoromethyl, and the like.

The anion, Z, is an inorganic, negatively-charged ion, for example, halide, sulfate, acid sulfate, nitrate, and the like or an organic sulfonate ion, for example, methanesulfate, benzenesulfonate, p-toluenesulfonate, p-chlorobenzenesulfonate, and the like.

The quaternary ammonium salts of Formula III are prepared by causing the corresponding free bases to react with esters of strong inorganic or organic sulfonic acids, for example, lower-alkyl halides, lower-alkyl arenesulfonates, and lower-alkyl alkanesulfonates. The reaction of the free base and the quarternizing agent takes place upon simple admixture of the components, preferably in the presence of an inert solvent, although heating may be applied to accelerate the reaction.

The acid-addition salt forms and the quaternary compounds preferably have anions which are physiologically acceptable, that is, the anions do not appreciably increase the toxicity of the compound as a whole toward animal organisms. Such anions include, for example, the chloride, bromide, iodide, sulfate, acid sulfate, methanesulfonate, ethanesulfonate, benzenesulfonate, p-chlorobenzenesulfonate, and the like. Salt forms having toxic anions are, however, useful in that they serve as characterizing derivatives of the free bases and serve as intermediates for preparing non-toxic quarternary salt forms by conventional ion-exchange reactions. All acid-addition salt forms, regardless of the nature of their associated anions, are useful as intermediates in the purification of the free bases.

Pharmacological evaluation of the compounds has shown that they possess hypotensive and anti-spasmodic activity when administered to animal organisms in non-toxic doses. The new compounds are thus useful for lowering blood pressure in certain hypertensive conditions and for treating spastic disturbances of the gastrointestinal tract.

The structures of the compounds of the invention were established by their mode of synthesis and by the fact that their elementary analyses were in agreement with the assigned structures.

The following examples further illustrate the invention without limiting the latter thereto:

*Example 1.—1-carbethoxy-4[2-(2-phthalimido) ethyl]piperazine*

[Formula I, X=O, n=2, R=COOEt]

A mixture containing 21.3 g. (0.135 mole) 1-carbethoxy-piperazine and 16.0 g. (0.065 mole) of N-(2-bromoethyl)-phthalimide in 100 ml. of dry toluene was refluxed for twenty-four hours. The precipitate of 1-carbethoxy-piperazine hydrobromide was filtered off, and the filtrate was concentrated under reduced pressure, whereupon it crystallized. Recrystallization from 90 percent aqueous ethanol and then from methanol gave pure 1-carbethoxy-4-[2-(2-phthalimido)ethyl]piperazine consisting of white ganular crystals melting at 105.8–107.4° C. (corr.).

*Example 2.—1-carbethoxy-4-[2-(2-phthalimido)ethyl] piperazine 4-methiodide* was prepared from the free base of Example 4 by reflexing 0.01 mole of the latter compound with 0.02 mole of methyl iodide in 50 ml. of methyl ethyl ketone for about five hours. After recrystallization from absolute ethanol, the 1-carbethoxy-4-[2-(2-phthalimido)ethyl]piperazine, consisting of fine, pale-yellow crystals, melted at 222.6–225.2° C. (corr.).

*Example 3.—1-methyl-4-[2-(2-isoindolinyl) ethyl]piperazine trihydrochloride*

[Formula I, X=H$_2$, R=CH$_3$, n=2]

To a suspension of 15.2 g. (0.4 mole) of lithium aluminum hydride in 500 ml. of absolute ether was added a solution containing 34.5 g. (0.104 mole) of 1-carbethoxy-4-[2-(2-phthalimido)-ethyl]piperazine in 900 ml. of absolute ether at a rate sufficient to maintain the reaction mixture at reflux without external heating. After the addition was complete the mixture was refluxed for about four hours and allowed to cool. Water was then added dropwise to hydrolyze the resulting aluminum complex. The precipitate which formed was repeatedly washed with ether and the solvent was removed from the ether solution. The remaining brown oil, consisting of crude 1-methyl-4-[2-(2-isoindolinyl)-ethyl]piperazine, was crystallized from n-pentane. After recrystallization from acetone, the product free base melted at 68–72°. The trihydrochloride salt was prepared by adding an excess of ethereal hydrogen chloride to an ethanolic solution of the free base. After repeated recrystallization from aqueous ethanol, the pure 1-methyl-4-[2-(2-isoindolinyl)ethyl] piperazine trihydrochloride melted at 287–290° C. (corr.).

The following compounds were prepared according to the procedure given in Example I from 1-carbethoxy-piperazine and the designated phthalimidoalkyl halide:

*Example 4. — 1-carbethoxy-4-[5-(2-phthalimido)pentyl]-piperazine hydrochloride,* M.P. 201.0–204.8° C. (corr.), from N-(5-chloropentyl)phthalimide;

*Example 5.—1 - carbethoxy-4-[3-(2-phthalimido)propyl]-piperazine,* M.P. 95.0–96.6° C. (corr.), from N-(3-chloropropyl)piperazine;

*Example 6.—1-carbethoxy-4-[4-(2-phthalimido)butyl] piperazine,* M.P. 71.8–73.2° C. (corr.), from N-(4-chlorobutyl)piperazine.

The following compounds were prepared according to the procedure given in Example II from methyl iodide and the appropriate free base:

*Example 7.—1 - carbethoxy-4-[3-(2-phthalimido)propyl]-piperazine 4-methiodide,* M.P. 209.8–212.6° C. (corr.);

*Example 8.*—*1 - carbethoxy-4-[5-(2-phthalimido)pentyl]-piperazine 4-methiodide*, M.P. 150.4–152.4° C. (corr.).

The following compounds were prepared according to the procedure given in Example III by reducing the appropriate 1 - carbethoxy - 4 - (phthalimidoalkyl)piperazine:

*Example 9.*—*1-methyl-4-[3-(2 - isoindolinyl) propyl]-piperazine trihydrochloride*, M.P. 269.6–271.6° C. (corr.);

*Example 10.*—*1 - methyl-4-[4-(2-isoindolinyl)butyl]-piperazine*, M.P. 68.6–71.8° C. (corr.);

*Example 11.*—*1 -methyl-4-[5-(2-isoindolinyl)pentyl]-piperazine trihydrochloride*, M.P. 279.0–281.4° C. (corr.).

The following additional examples of the invention can be prepared according to the procedure shown in Example 1:

*Example 12.*—*1 - carbethoxy-4[3-(4,5,6,7-tetrachloro-2-phthalimido)-2-methylpropyl]piperazine* from 2 - (3-chloro-2 - methylpropyl)-4,5,6,7 - tetrachlorophthalimide and N-carbethoxypiperazine;

*Example 13.* — *1 - carbopropoxy - 4-[8-(5-methoxy-2-phthalimido)-octyl]piperazine* from 2-(8-chloro-octyl)-5-methoxyphthalimide and N-carbopropoxypiperazine;

*Example 14.*—*1-carbobutoxy-4-[9-(5-methyl-2-phthalimido)-nonyl]piperazine* from 2-(9-chlorononyl)-5-methylphthalimide and N-carbobutoxypiperazine;

*Example 15.* — *1 - carbohexoxy - 4 - [6-(5-methoxy-2-phthalimido)-hexyl]-piperazine* from 2-(6-chlorohexyl)-5-methoxyphthalimide and N-carbohexoxypiperazine;

*Example 16.* — *1 - carbopentoxy - 4-[2-(4-n-butoxy-2-phthalimido)-propyl]piperazine* from 2-(2-chloropropyl)-4-n-butoxyphthalimide and N-carbopentoxypiperazine;

*Example 17.* — *1 - carboisopropoxy-4-[10-(4-methyl-2-phthalimido)-decyl]piperazine* from 2 - (10-chlorodecyl)-4-methylphthalimide and N-carboisopropoxypiperazine;

*Example 18.* — *1 - carboisobutoxy-4-[7-(5-methylmercapto-2-phthalimido)heptyl]piperazine* from 2-(7-chloroheptyl)-5-methylmercaptophthalimide and N-carboisobutoxypiperazine;

*Example 19.*—*1-carbo-sec.-butoxy-4-[4-bromo-2-phthalimido)-2-ethylbutyl]piperazine* from 2-(4-chloro-2-ethylbutyl)-4-bromophthalimide and N-carbo-sec.-butoxypiperazine; and

*Example 20.* — *1-carbo-tert.-butoxy-4-[3-(5-chloro-2-phthalimido)-2-butyl]piperazine* from 2 - (3 - chloro-2-butyl)-5-chlorophthalimide and N-carbo-tert.-butoxypiperazine. The latter intermediate is prepared from piperazine and tert.-butyl chloroformate.

The following examples can be prepared according to the procedure shown in Example 2:

*Example 21.* — *1-carbethoxy-4-[3-(4,5,6,7-tetrachloro-2-phthalimido) - 2-methylpropyl]piperazine ethobromide*, which has the formula

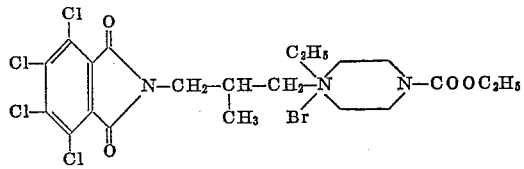

can be prepared from 1-carbethoxy-4-[3-(4,5,6,7-tetrachloro - 2 - phthalimido)-2-methylpropyl]piperazine and ethyl chloride;

*Example 22.* — *1 - carbopropoxy-4-[8-(5-methoxy-2-phthalimido)-octyl]piperazine allylbromide*, which has the formula

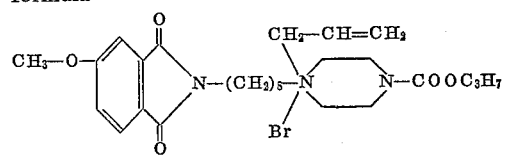

can be prepared from 1-carbopropoxy-4-[8-(5-methoxy-2-phthalimido)-octyl]piperazine and allyl bromide;

*Example 23.*—*1 - carbobutoxy-4-[9-(5-methyl-2-phthalimido)-nonyl]piperazine ethomethanesulfonate*, which has the formula

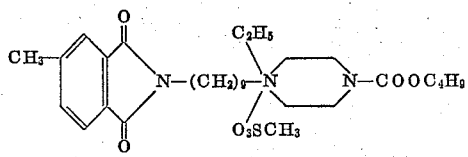

which can be prepared from equimolar quantities of 1-carbobutoxy - 4 - [9 - (5-methyl-2-phthalimido)nonyl]piperazine and ethyl methanesulfonate;

*Example 24.*—*1 - carbohexoxy - 4 - [6-(5-methoxy-2-phthalimido) - hexyl]-piperazine - etho-p-chlorobenzenesulfonate*, which has the formula

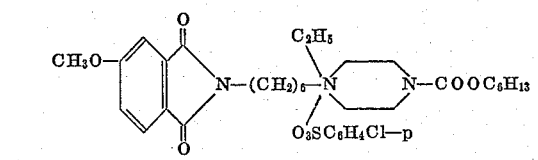

can be prepared from 1-carbohexoxy-4-[6-(5-methoxy-2-phthalimido)hexyl]piperazine and ethyl p-chlorobenzenesulfonate;

*Example 25.*—*1 - carbopentoxy - 4 - [2-(4-n-butoxy-2-phthalimido)-propyl]piperazine benzochloride*, which has the formula

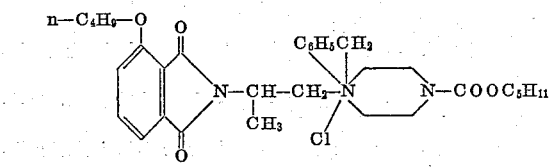

can be prepared from 1-carbopentoxy-4-[2-(4-n-butoxy-2-phthalimido)-propyl]piperazine and benzyl chloride;

*Example 26.*—*1-carboisopropoxy-4-[10-(4-methyl-2-phthalimido)-decyl]piperazine thenylchloride*, which has the formula

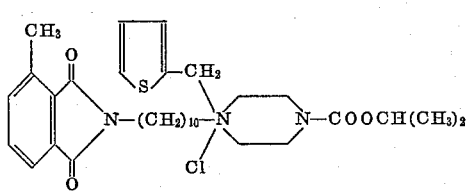

can be prepared from equimolar quantities of 1-carboisopropoxy- 4-[10-(4-methyl-2-phthalimido)decyl]piperazine and thenyl chloride;

*Example 27.* — *1-carboisobutoxy-4-[7-(5-methylmercapto - 2 - phthalimido)heptyl]piperazine butobromide* which has the formula

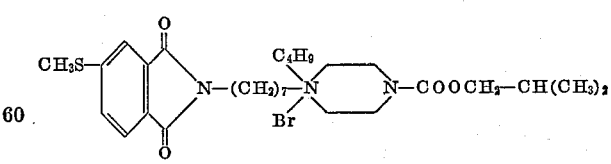

can be prepared from 1-carboisobutoxy-4-[7-(5-methylmercapto-2-phthalimido)heptyl]piperazine and butyl bromide;

*Example 28.* — *1-carbo-tert.-butoxy-4-[3-(5-chloro-2-phthalimido)-2-butyl]piperazine methosulfate*, which has the formula

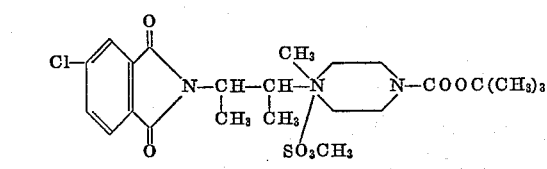

can be prepared from 1-carbo-tert.-butoxy-4-[3-(5-chloro-2-phthalimido)-2-butyl]piperazine and dimethyl sulfate; and

*Example 29.—1 - carbo-sec. - butoxy-4-[4-(4-bromo-2-phthalimido) - 2 - ethylbutyl]piperazine ethobenbenesulfonate* which has the formula

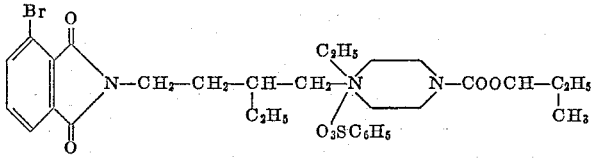

can be prepared from 1-carbo-sec.-butoxy-4-[4-(4-bromo-2-phthalimido)-2-ethylbutyl]piperazine and ethyl benzenesulfonate.

The following 1-methyl-4-isoindolinylakylpiperazines can be prepared from the corresponding phthalimides by reduction according to the procedure shown in Example 3:

*Example 30. — 1 - methyl-4-[3-(4,5,6,7-tetrachloro-2-isoindolinyl)-2-methylproply]piperazine.*

*Example 31.—1 - methyl - 4 - [8-(5-methoxy-2-isoindolinyl)-octyl]piperazine;*

*Example 32.—1-methyl-4-[9-(5-methyl-2-isoindolinyl)-nonyl]piperazine;*

*Example 33.—1 - methyl - 4 - [6 - 5 - methoxy-2-isoindolinyl)hexyl]piperazine;*

*Example 34.—1 - methyl - 4 - [2-(4-n-butoxy-2-isoindolinyl)-propyl]piperazine;*

*Example 35. — 1 - methyl-4-[10-(4-methyl-2-isoindolinyl)-decyl]piperazine;*

*Example 36. — 1 - methyl-4-[7-(5-methylmercapto-2-isoindolinyl)heptyl]piperazine;*

*Example 37.—1-methyl-4-[4-(4-bromo-2-isoindolinyl)-2-ethylbutyl]piperazine;* and

*Example 38.—1-methyl-4-[3-(5-chloro-2-isoindolinyl)-2-butyl]piperazine.*

We claim:
1. 1 - carbo-lower-alkoxy-4-[(2-phthalimido)A]piperazine, wherein A is alkylene of from two to ten carbon atoms.
2. 1-carbethoxy-4-[5-(2-phthalimido)pentyl]piperazine.
3. 1-carbethoxy-4-[4-(2-phthalimido)butyl]piperazine.
4. 1 - carbethoxy - 4-[3-(2-phthalimido)propyl]piperazine.
5. 1-carbethoxy-4-[2-phthalimido)ethyl]piperazine.
6. 1 - carbethoxy-4-[(2-phthalimido)A]-4-R-piperazinium salts with non-toxic anions wherein R is selected from the group consisting of lower-alkyl, lower-alkenyl, and monocarbocyclic-aryl-lower-alkyl, wherein A is alkylene of from two to ten carbon atoms.
7. 1 - carbethoxy-4-[2-(2-phthalimido)ethyl]piperazine 4-methiodide.
8. 1-carbethoxy-4-[3-(2-phthalimido)propyl]piperazine 4-methiodide.
9. 1-carbethoxy-4-[5-(2-phthalimido)pentyl]piperazine 4-methiodide.

References Cited by the Examiner

UNITED STATES PATENTS

| | | | |
|---|---|---|---|
| 2,672,460 | 3/54 | Conroy | 260—268 |
| 2,909,523 | 10/59 | Bach et al. | 260—268 |
| 3,055,901 | 9/62 | Speranza et al. | 260—268 |
| 3,084,167 | 4/63 | Rice | 260—268 |

OTHER REFERENCES

Fieser et al., Advanced Organic Chemistry, page 279, Reinhold Pub. Corp., New York (1961).

Kermack et al., Journal Chemical Society (London), pp. 3096–3104 (1931).

Rice et al., Journal Organic Chemistry, vol. 19, pp. 884–893 (1954).

NICHOLAS S. RIZZO, *Primary Examiner.*

IRVING MARCUS, *Examiner.*

UNITED STATES PATENT OFFICE
CERTIFICATE OF CORRECTION

Patent No. 3,198,798                          August 3, 1965

Bernard L. Zenitz et al.

It is hereby certified that error appears in the above numbered patent requiring correction and that the said Letters Patent should read as corrected below.

Column 5, lines 41 and 42, for "-butoxy-4-[4-bromo-2-phthalimido", in italics, read -- -butoxy-4-[4-(4-bromo-2-phthalimido --, in italics; column 6, lines 70 to 75, for that portion of the formula reading "SO$_3$CH$_3$" read -- SO$_4$CH$_3$ --; column 7, lines 7 to 13, for that portion of the formula reading

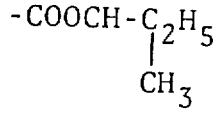     read     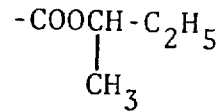

column 8, line 9, for "-4-[2-phthalimido" read -- -4-[2-(2-phthalimido --.

Signed and sealed this 18th day of October 1966.

(SEAL)
Attest:

ERNEST W. SWIDER
Attesting Officer

EDWARD J. BRENNER
                                       Commissioner of Patents